April 3, 1928.  
E. R. FERRARI  
1,665,131  
CUTTING OR SLICING MACHINE  
Filed March 30, 1926  
4 Sheets-Sheet 3
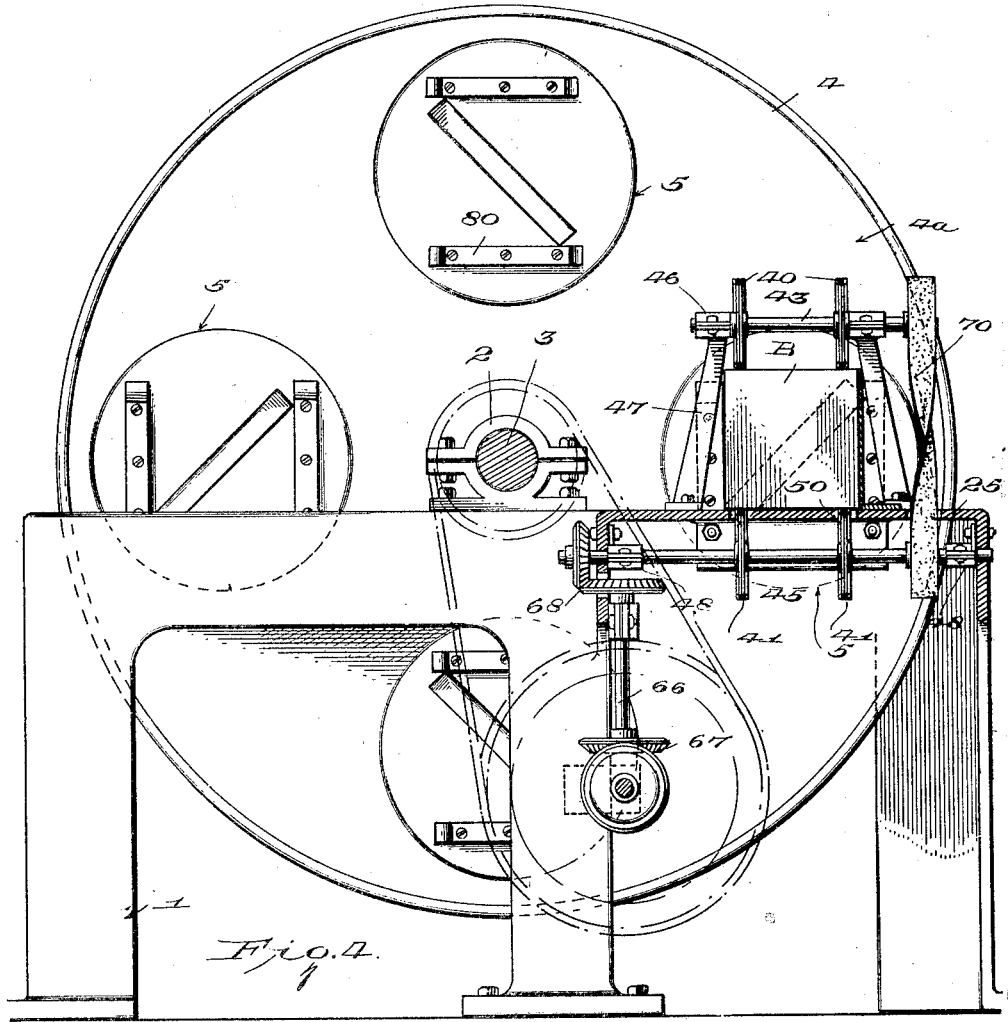
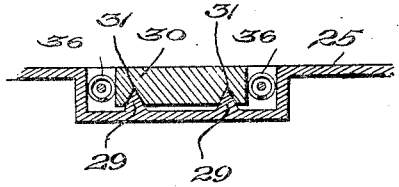
WITNESSES
INVENTOR  
E. R. Ferrari  
BY  
ATTORNEYS

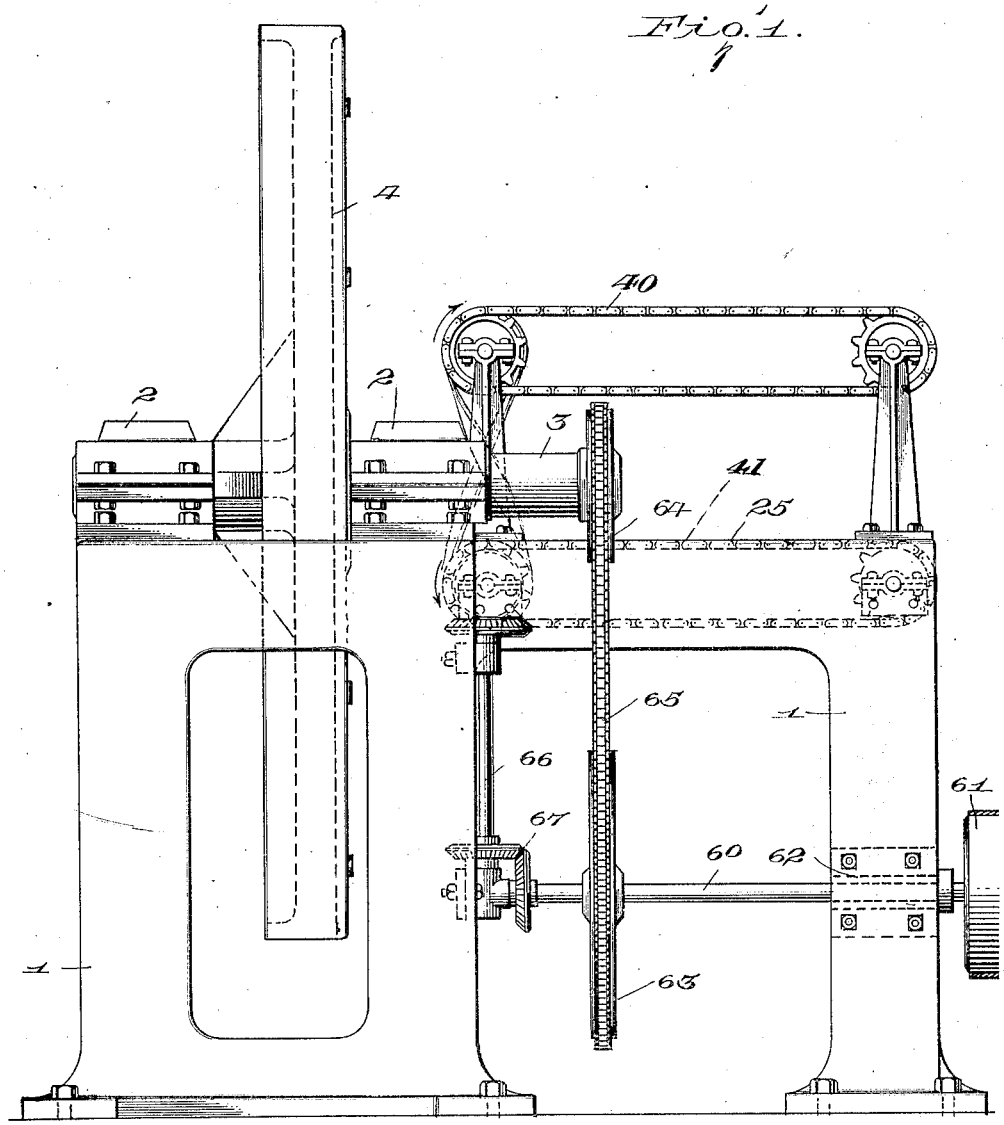

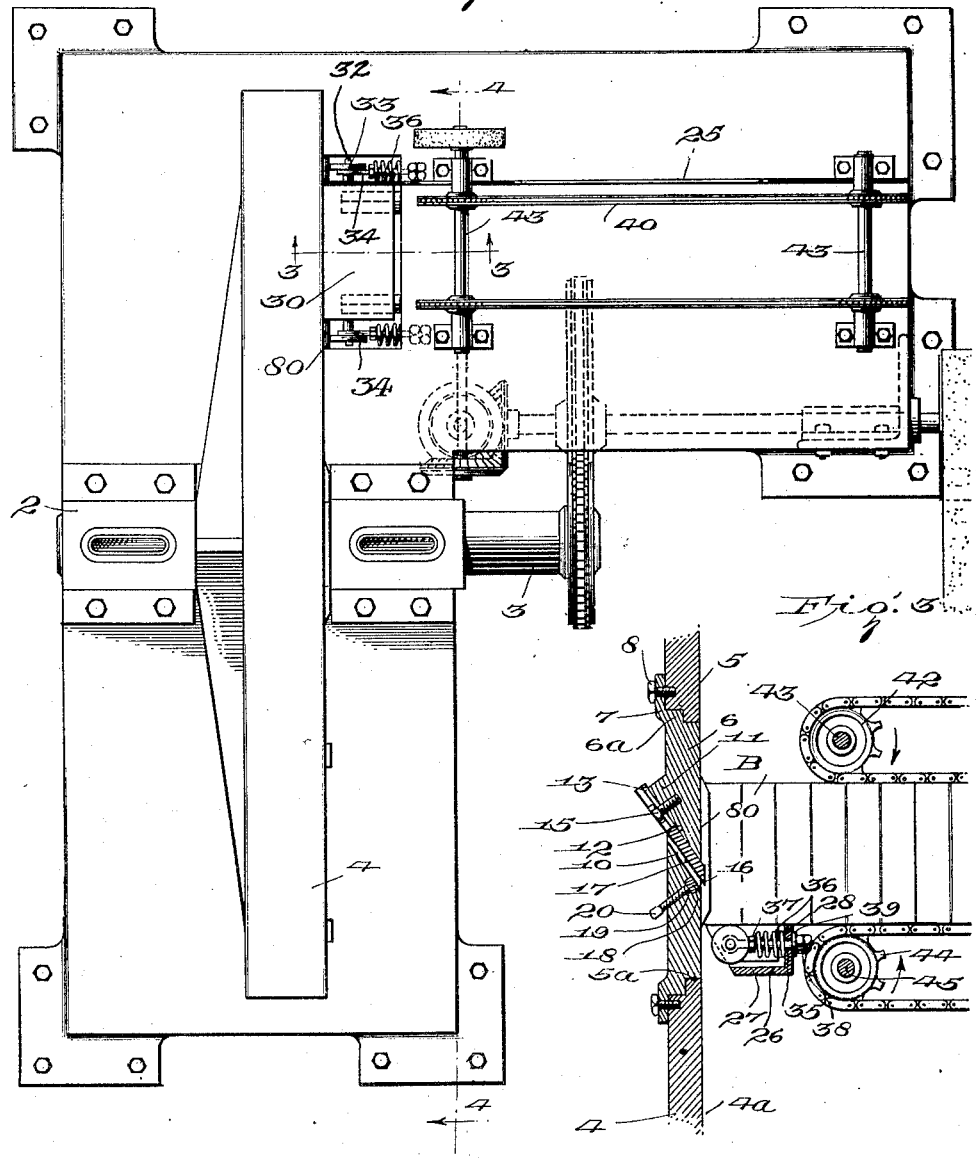

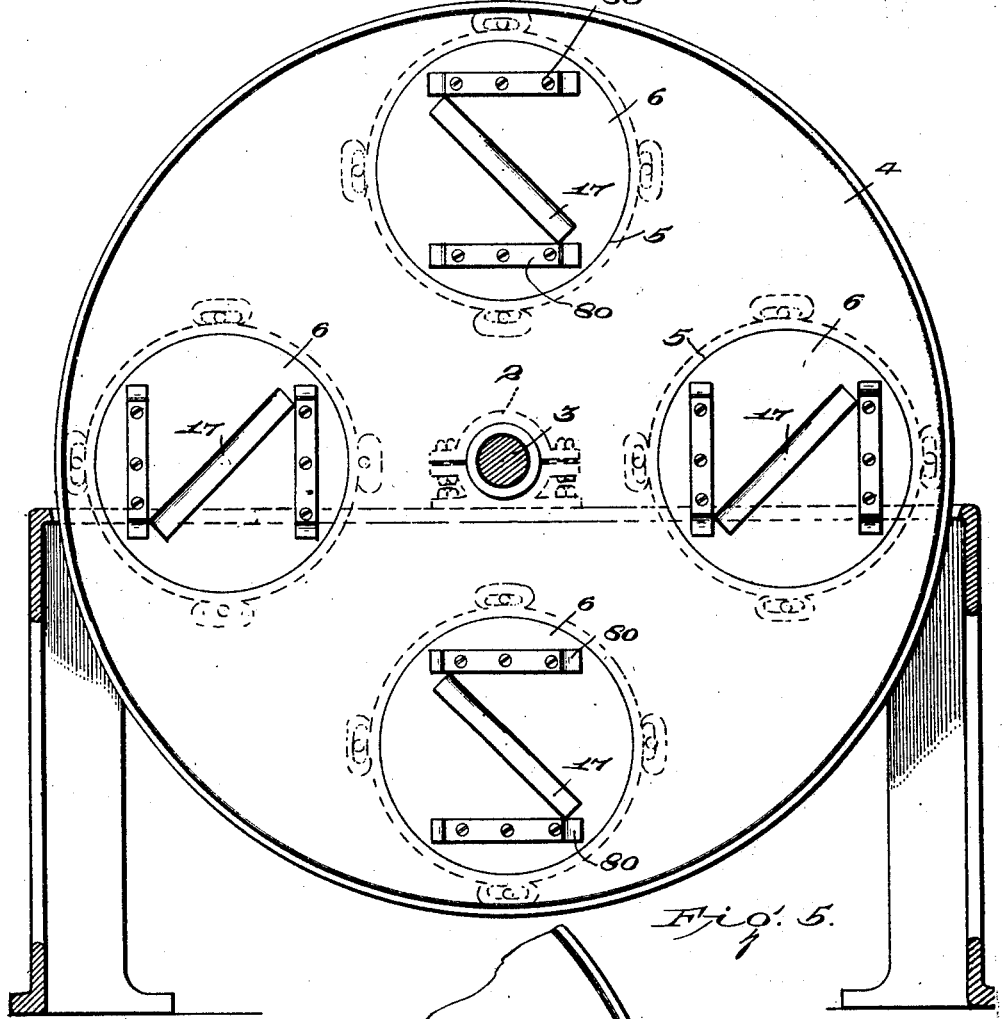
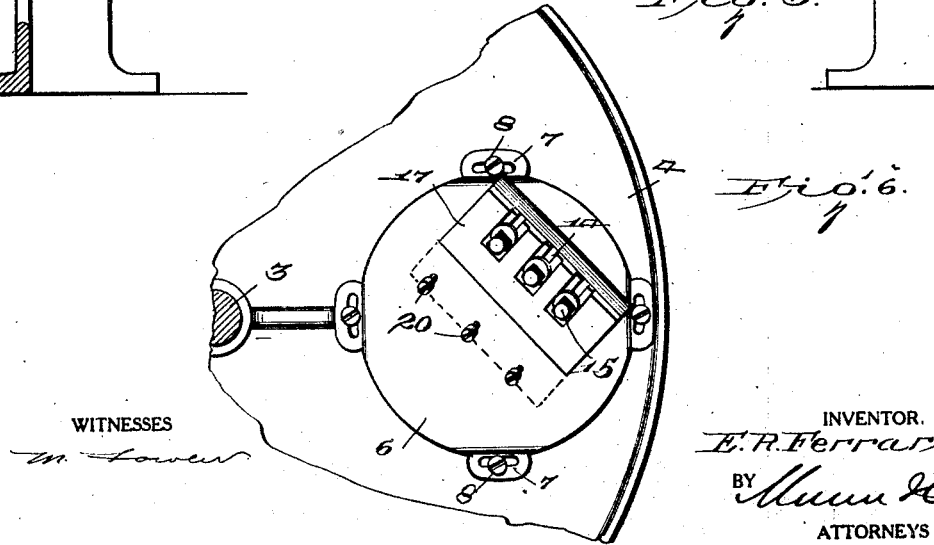

Patented Apr. 3, 1928.

1,665,131

UNITED STATES PATENT OFFICE.

EARNEST R. FERRARI, OF NORTH BEND, OREGON.

CUTTING OR SLICING MACHINE.

Application filed March 30, 1926. Serial No. 98,550.

This invention relates to a cutting or slicing machine especially adapted for use in forming thin sheets or plates of wood.

One of the principal objects of the invention is to provide a machine of this character which is especially adapted to produce battery separators out of small blocks or waste lumber that now can only be used for fuel. The invention is also adapted for use in producing therein sheet-like veneer stock which may be employed in the construction of berry baskets as well as in other uses.

An important advantage of the present invention when used to produce a separator for batteries resides in the fact that the present machine may be employed to make vertical grain separators as well as flat grain separators.

In carrying out the present invention a main rotary wheel is provided and on the wheel angularly adjustable knife carriers are mounted, the knife carriers carrying adjustable knives or cutters, the knives of the wheel successfully coacting with an automatically shiftable table to which the blocks of wood or other stock are fed under the control of automatic feeding means.

Other objects and advantages resides in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing a machine embodying the present invention, Figure 2 is a plan view thereof, Figure 3 is a fragmentary detail view in vertical section taken on the line 3—3 of Figure 2, Figure 4 is a view in vertical section taken on the line 4—4 of Figure 2, Figure 5 is a view showing the main wheel in front elevation, the associated parts of the frame and the shaft on which the wheel is carried being shown in section, Figure 6 is a fragmentary view in elevation of a portion of the other face of the wheel from that shown in Figure 5, and Figure 7 is a detail sectional view on the line 7—7 of Figure 6.

Referring to the drawings it will be seen that the machine includes a suitable frame 1 on which bearings 2 are provided. A main shaft 3 is rotatably fitted in the bearings 2 and between the bearings 2 a main wheel 4 is fixed to the shaft 3. The wheel 4 consists of a disc-like plate of metal or other suitable material which may be thickened at its hub and flanged at its rim, the body of the wheel being formed with a flat surface 4ª. This body of the wheel is also provided with a plurality of spaced openings 5, the openings 5 in the present embodiment of the invention being indicated at angular intervals of 90°. As shown in Fig. 3 the walls of the openings 5 are preferably stepped and present a flange 5ª at the inner face or flat face 4ª of the wheel 4. In each of the openings 5 a circular cutter carrier 6 is adjustably fitted, the periphery of the carrier 6 being stepped to correspond with the wall of the opening 5 in which it is fitted. The stepped formation of the periphery of the carrier 6 provides a flange 6ª which fits against the flange 5ª. A plurality of attaching ears 7 are integrally formed with each carrier 6 and these attaching ears co-act with stud bolts or other fastening means 8 to secure the carriers to the wheel with their flanges 6ª engaging the flanges 5ª. By providing slots in the ears 7 or by providing a plurality of bolt holes in the wheel 4 around each opening 5 the carriers 6 may be angularly adjusted in their openings and secured in any desired adjustment.

Each carrier 6 is provided with an inclined opening 10 extending therethrough and diametrically thereof. An enlargement 11 is integrally provided on each carrier and has one face which merges into one wall of the opening 10, the enlargement thus aiding in providing a seat 12 for a knife or cutter 13. Each knife or cutter 13 is provided with a plurality of spaced slots 14 with which bolts 15 co-act to secure the cutter or knife in adjusted position on its seat, as illustrated to advantage in Figs. 3, 6 and 7. As shown in Fig. 3 each cutter or knife has an edge 16 which projects through the opening 10 and slightly beyond the inner face 4ª of the wheel 4. The knives 13 do not fill the openings 10 but leave spaces 17 through which the severed sheets or plates of wood pass. Adjacent to or opposite the edge 16 of each knife a presser bar 18 is provided, each presser bar being adjustably supported in a groove 19 provided in each carrier 6 along the inner portion of its opening 10. The presser bars 18 may be adjusted in any suitable way and for the sake of illustration are shown as having swivel connection with the inner ends of set screws 20, the set screws 20 being threadedly connected with the carriers.

The wheel 4 operates at one end of a table 25 supported upon the frame 1. At the end of the table adjacent the wheel 4 a pocket 26 is provided and is defined by a bottom wall 27 and an end wall 28. The bottom wall 27 is provided with upwardly extending inverted V-shaped ribs 29, and on these ribs 29 a sliding or shiftable anvil 30 is supported, the anvil 30 having inverted V-shaped grooves 31 in which the ribs 29 are fitted. The anvil 30 has integrally formed therewith or otherwise rigidly connected thereto laterally extending trunnions 32, on which rollers 33 are fitted. One end of a rod 34 is connected with each trunnion 32, and the other end of each rod 34 is slidable through an opening 35 in the wall 28. Compression coil springs 36 are mounted on the rods 34 and one end of each coil spring 36 engages the end wall 28, the other end of such coil spring engaging an adjustable abutment 37 which may take the form of a nut threadedly connected with the rod 34. The coil springs 37 tend to project the anvil 30 toward the wheel 4 as far as it may be projected. This action of the coil springs is limited by means of nuts 38 threaded on the rearwardly extending ends of the rods and having washers 39 associated therewith.

Feeding mechanism is provided for feeding the blocks B of wood or the other stock to be spliced across the table 25 onto the anvil 30 and against the flat surface 4ᵃ of the wheel 4 where these blocks will come into the field of operation of the cutters or knives mounted on the carriers of the wheel. This feeding mechanism preferably consists of upper and lower pairs of sprocket chains, indicated at 40 and 41, respectively, the upper sprocket chains 40 being threaded around sprocket wheels 42 fixed on shafts 43, the lower sprocket chains 41 being trained around sprocket wheels 44 fixed on shafts 45. The shafts 43 are rotatable in bearings 46 provided at the upper ends of bearing brackets 47, the lower ends of the bearing brackets 47 being secured to the table 25. The shafts 45 are rotatable in bearings 48 carried by the underside of the table 25. As shown to advantage in Fig. 4 the lower sprocket chains 41 operate in slots 50 formed in the table 25 and extending lengthwise thereof. The upper runs of the sprocket chains 50 project slightly above the table so as to have the desired frictional engagement with the blocks. At this point it should be noted that the blocks B or stock is driven by virtue of the frictional engagement of the sprocket chains therewith and this permits of the desirable slippage occurring in certain phases of the operation.

The machine is provided with a drive shaft 60 having a pulley 61 fixed thereto and adapted to be driven from a motor, line shaft or any other suitable source of power. This shaft 60 is journaled in suitable bearings 62 provided therefor in the frame 1 and has a pulley 63 and serving to drive a pulley 64 fixed to the shaft 3 through the medium of a belt 65 trained over the pulleys 63 and 64. The sprocket chains 40 and 41 are also driven from the shaft 60 by means of suitable gearing or motion transmission means which is shown as comprising a vertical shaft 66 driven from the shaft 60 by means of beveled gears 67, the vertical shaft 66 serving to drive one of the shafts 45 through beveled gears 68. The shafts 43 are driven from one of the shafts 45 by means of belt and pulley gearing 70.

In the operation of the machine the blocks are fed up against the face 4ᵃ of the wheel 4 by the sprocket chains 40 and 41 and when a block is forced against the face 4ᵃ of the wheel 4 it rests on the anvil 30 and is in the field of action or movement of the knives or cutters 13. These knives or cutters are mounted on the carriers which may be adjusted to carry the knives at the desired incline or angularity that results in the sweeping across the block with a sliding cut, thereby enhancing the cutting action.

In order to cause the anvil 30 to be retracted to permit the blades to pass the same camming ribs 80 are provided on each carrier and are engageable with the rollers 30 to automatically retract the anvil at the proper time in the cycle of operation. This action also retracts the anvil to prevent the last thin slice of a block from being jammed in between the anvil and the wheel.

I claim:—

1. A slicing machine of the character described comprising a rotatable wheel, a plurality of carriers mounted on the wheel for angular adjustment, knives mounted on said carriers, a table co-operably disposed with respect to the wheel and its knives, means for feeding the stock across the table and into the field of action of the knives, said table having a slidable anvil at the end thereof with which the wheel and its knives co-act spring means for projecting the anvil toward the wheel, and co-operating means on the carriers and anvil for causing detraction of the anvil in certain phases of the operation.

2. In an apparatus of the character described, a rotary cutter comprising a disk having a plurality of cutters extending from one face thereof, a block supporting anvil movable at right angles to the cutters, rollers carried by the anvil adapted to ride upon the associated face of the disk, and means carried by the disk adapted to cooperate with the rollers for moving the anvil away from the disk when a cutter approaches register with the anvil.

3. In an apparatus of the character described, a rotary cutter comprising a disk having a plurality of cutters extending from one face thereof, a block supporting anvil movable at right angles to the cutters, rollers carried by the anvil adapted to ride upon the associated face of the disk, and cams carried by the disk adapted to engage the rollers and move the anvil away from the disk when a cutter passes the same.

4. In an apparatus of the character described, a rotary cutter comprising a disk having a plurality of cutters extending from one face thereof, a block supporting anvil movable at right angles to the cutters, rollers carried by the anvil adapted to ride upon the associated face of the disk, means carried by the disk adapted to cooperate with the rollers for moving the block away from the disk when a cutter approaches register with the anvil, and spring means associated with the anvil to force the rollers against the associated face of the disk.

5. In an apparatus of the character described, a rotary cutter comprising a disk having a plurality of cutters extending from one face thereof, a block supporting anvil movable at right angles to the cutters, means carried by the anvil adapted to ride upon the associated face of the disk, and means cooperating with the last named means for moving the anvil away from the disk when a cutter approaches register with the same.

EARNEST R. FERRARI.